July 11, 1961
R. J. STANTON ET AL
2,992,319
METHOD OF WELDING METAL ELEMENTS
Filed Aug. 25, 1959
2 Sheets-Sheet 1
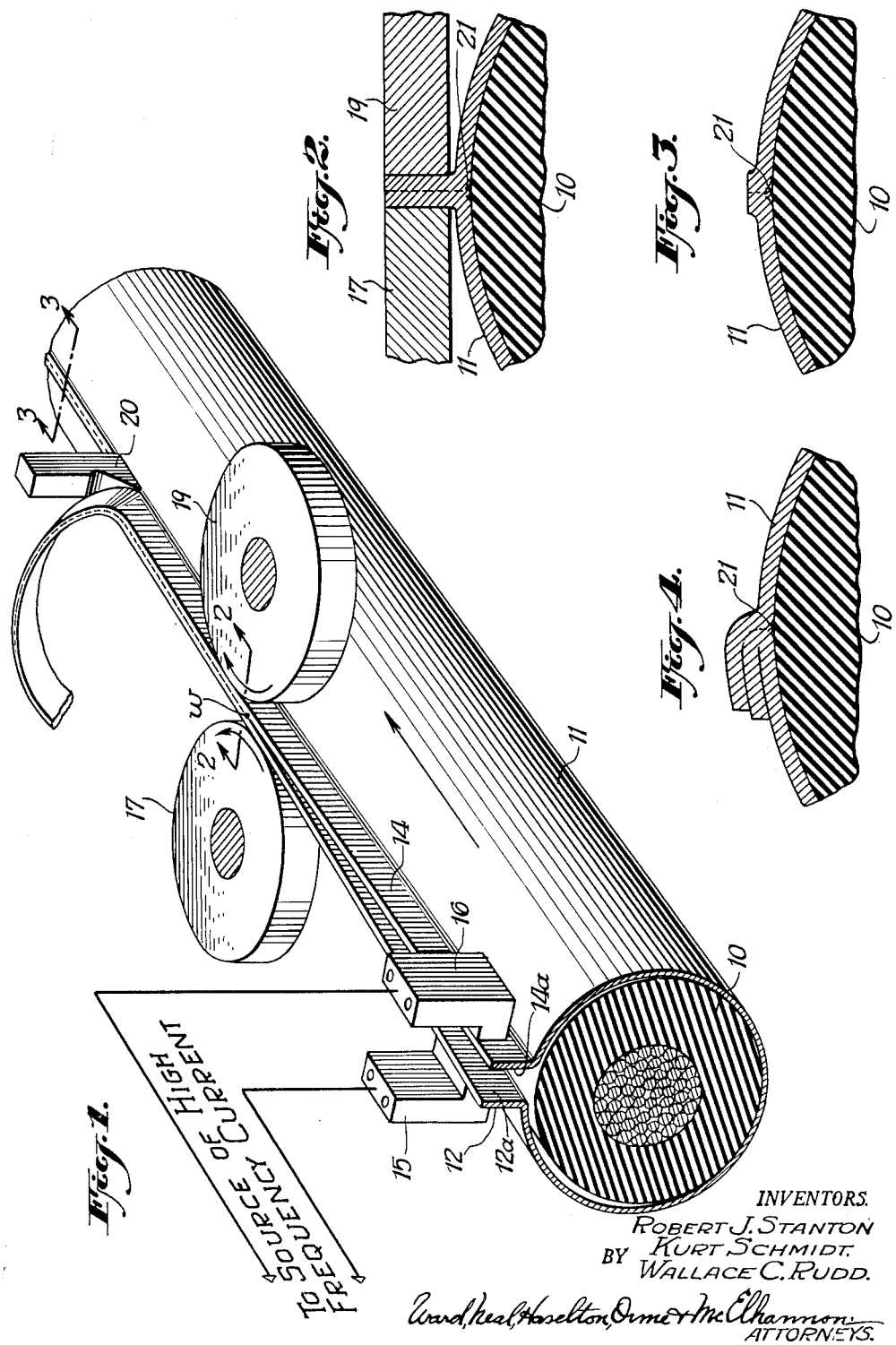
INVENTORS.
ROBERT J. STANTON
KURT SCHMIDT.
WALLACE C. RUDD.
BY
ATTORNEYS.

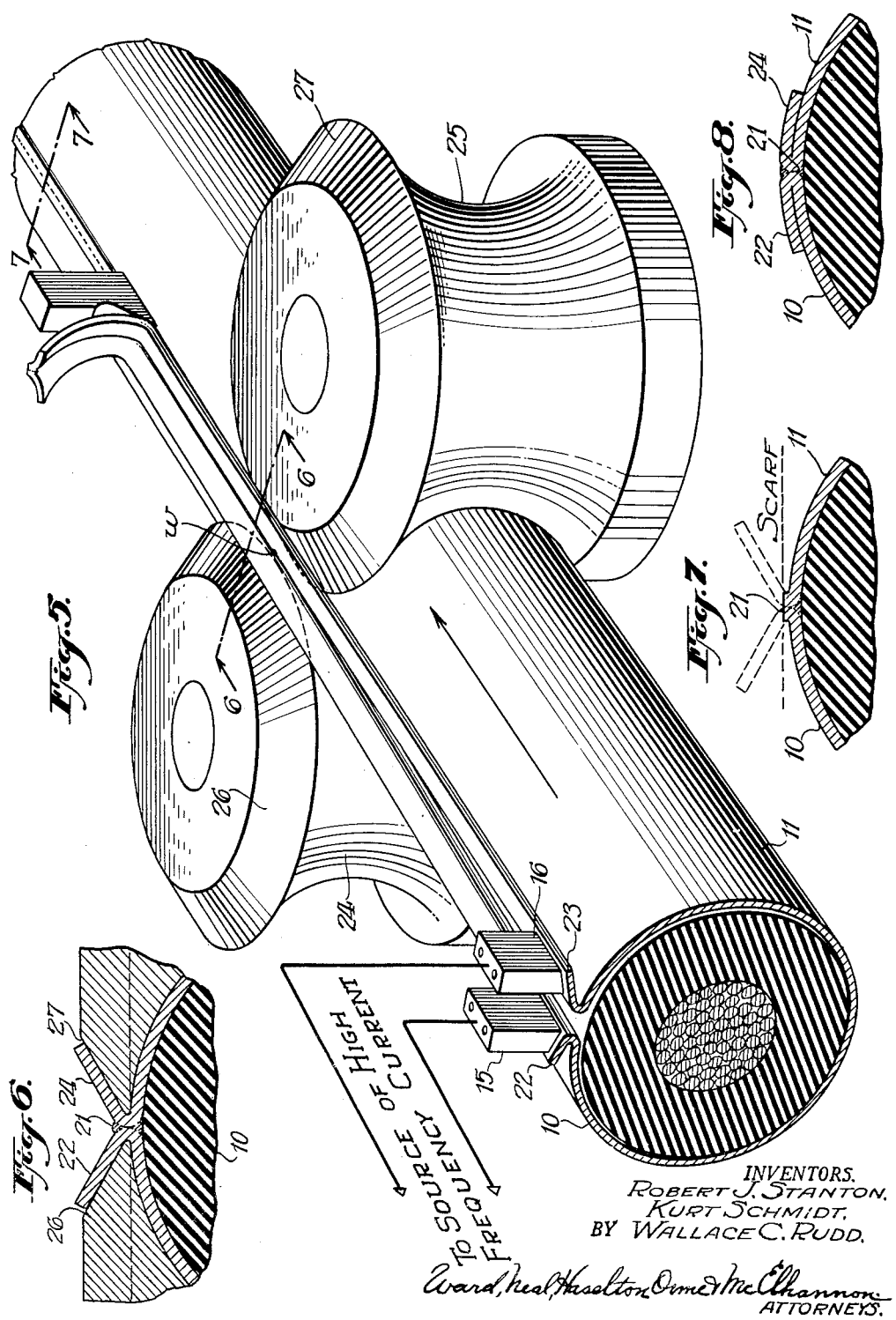

United States Patent Office 2,992,319
Patented July 11, 1961

2,992,319
METHOD OF WELDING METAL ELEMENTS
Robert J. Stanton, Brooklyn, N.Y., Kurt Schmidt, Koln-Mulheim, Germany, and Wallace C. Rudd, Larchmont, N.Y., assignors to Magnetic Heating Corp., New Rochelle, N.Y., a corporation of New York
Filed Aug. 25, 1959, Ser. No. 835,904
3 Claims. (Cl. 219—67)

This invention relates to welding methods, and more particularly, to improved methods for welding together opposed edge portions of metal elements.

Heretofore, it has been known to effect butt and lap welds of opposed edge portions of metal elements, such for example, as metal tubing that is formed with a longitudinal gap therealong by advancing the elements longitudinally while bringing the opposed edges from spaced apart relation with an elongated V-shaped gap therebetween into contact at a weld point, and heating the edge portions to welding temperature at the weld point. In accordance with the known methods, the edge portions may be brought together in face to face relation to form a butt weld, or one edge portion may be brought into overlapping relation to the other edge portion to form a lap weld. It is also known to apply a source of heating current to such edges of a frequency sufficiently high that the current will follow a path along one edge of the gap to the weld point and back along the opposite edge of the gap to heat the edge portions to welding temperature; thus oscillating current of a frequency of the order of 100,000 cycles per second or higher has been utilized for this purpose.

When effecting such welds by the known methods, there is formed a longitudinal bead along the underside of the seam, or internally of the tube where tubing is being formed; and, while the formation of such a bead is not ordinarily objectionable, there are circumstances wherein its presence gives rise to certain undesirable characteristics in the use of the welded product. For example, in the case of tubing, such a bead may give rise to the existence of turbulence and interference with the flow pattern of fluids flowing through the tube, particularly when the tube is of small diameter. Additionally, where the tube is used for the sheathing of cables, and the like, the bead may weaken or damage the skin of the cable; and, where the sheathing is welded while surrounding the cable, the known methods of welding heat portions of the metal that are immediately adjacent or contiguous with the cable skin thus bringing the destructive effects of the heat to the cable. The formation of beads, also serves to conduct the heat into even greater damaging proximity to or contact with the cable.

Applicants are, of course, aware of the existence of grinding and scarfing equipment for the removal of beads and burrs; however, the use of such equipment is not always feasible, as where the diameter of the tubing is too small to admit such equipment into the tube, or where the tubing is formed immediately surrounding another object as in the case of cable sheathing.

Accordingly, the present invention is particularly important where it is necessary or desirable to obviate the generation or conduction of excessive heat at or to one surface of the seam, as well as the presence of beads along the welding seam, and particularly on the interior of tubing.

In essence, the present invention contributes a method which meets the foregoing requirements with simplicity and convenience. As a particular feature of the present invention, longitudinal flanges are formed at the opposed edge portions to be welded, and the edge portions are then advanced longitudinally relatively to a weld point from a spaced apart relation with an elongated V-shaped gap therebetween into abutting relation at the weld point, the flanges being heated to welding temperature by the application thereto of current of a frequency sufficiently high that the lowest impedance path thereof extends along on the opposed surfaces of the flanges to and from the points of application thereof through the weld point whereby the resistance heating effect of such current is concentrated on those portions of the flange surfaces that are in greatest relative proximity; such frequency being of the order of 100,000 cycles per second, or more. The opposed flange surfaces may be squeezed together at substantially the weld point. As the seam is formed, the excess metal of the united flanges may be scarfed off or mashed down adjacent the surface of the elements being welded.

In the case of tubing, the flanges are formed exteriorly of the tube, while with flat elements, the flanges may be formed on either side of the elements.

Where the flanges are disposed at an angle of substantially 90° to the surface of the elements from which they are formed, or to the plane of a tangent to the tube where tubing is to be formed, and thus provide substantially flat opposed surfaces that are brought into parallel relation at substantially the weld point, they may be squeezed together by rollers, for example, having corresponding flat upstanding or vertical bearing surfaces. In this case, the electrical contacts are preferably applied on the remote surfaces of the flanges.

As a further feature of the present invention, however, the flanges may be formed at more than 90° so as to diverge relatively to one another in a direction away from the elements on which they are formed. Where such flanges are used, the electrical contacts may conveniently be applied to either the proximate or remote surfaces thereof, and the squeeze rollers may be contoured so that the flanges are hooked over the roller bearing surfaces for extremely accurate control of the weld seam.

It is important to realize that in the formation of such flanges, the exterior angles thus formed are not square, but are radiused so that the point of greatest proximity of the flanges is somewhat spaced from the adjacent unflanged portions of the elements being welded. With this in mind, it will be realized that upon the application of an oscillating current of the order of 100,000 cycles, per second or more to the flanges, the current path of lowest impedance will be on the opposed surfaces of the flanges substantially along a region of greatest proximity thereof, and thus somewhat spaced from the adjacent unflanged portions of the flanged elements. In this way the heat is concentrated along on the flange surfaces in spaced relation to the unflanged parts of the metal elements, and any bead formed between the flanges will also be spaced from such parts.

There has thus been outlined rather broadly the more important features of the present invention in order that a detailed description thereof that follows may be better understood and in order that the present contribution to the art may be better appreciated. There are, of course, additional features of the invention that will be described hereafter and which will form the subject of claims appended hereto. Those skilled in the art will appreciate that the conception on which the present disclosure is based may readily be utilized as the basis for designing other structures for carrying out the several purposes of this invention. It is important, therefore, that the claims be regarded as including such equivalent constructions so as not to depart from the concept and scope of this invention.

A specific embodiment of the invention has been chosen for purposes of illustration and description and is shown in the accompanying drawings, forming a part of the specification, wherein:

FIG. 1 is a perspective view illustrating the welding of tubular cable sheathing in accordance with one embodiment of the present invention;

FIG. 2 is a fragmentary cross-sectional view taken along the lines 2—2 of FIG. 1;

FIG. 3 is a cross-sectional view similar to FIG. 2, but taken along the lines 3—3 of FIG. 1;

FIG. 4 is a view similar to FIGS. 2 and 3 but illustrating the flanges mashed down against the remaining portion of the tubing;

FIG. 5 is a perspective view similar to FIG. 1, but illustrating a further embodiment of the invention;

FIG. 6 is a fragmentary cross-sectional view taken along the lines 6—6 of FIG. 5;

FIG. 7 is a fragmentary cross-sectional view taken along the lines 7—7 of FIG. 5; and FIG. 8 is a cross-sectional view similar to FIGS. 6 and 7, but illustrating the flanges of FIG. 4 mashed down against the adjacent surface of the tubular sheathing.

Referring now to the drawings, and more particularly to FIGS. 1 to 4 thereof, there is illustrated one embodiment of the present inventive concept wherein, for purposes of illustration, the invention is shown as a method of sheathing cable, although it will be understood that the method need not be confined to cable sheathing nor to the welding of opposed edges of metal tubes, but may also be utilized in the welding of the edge portions of any metal elements, tubular or otherwise.

In FIGS. 1 to 4 there is shown a cable 10 substantially surrounded by a tubular member 11 formed of sheet metal and constituting a sheath for the cable. It will be observed that the longitudinal edges of the member 11 are spaced apart with an elongated V-shaped gap therebetween, the apex of the gap constituting a weld point w. As best seen in FIGS. 1 and 2, the opposed edge portions of the member 11 are flanged outwardly as at 12, 14, by any suitable means (not shown), the flanges being formed at substantially 90° to a plane tangent to the tube surface at the base of the flange.

In accordance with the present invention, the cable 10 and sheath 11 are advanced in the direction of the arrow, by well known means such as feed rolls (not shown) while the opposed, inner surfaces 12a and 14a of the flanges are heated so that these surfaces reach welding temperature at the weld point w. Thus, it is preferred that the opposed flange surfaces be heated by the application thereto, through electrodes 15 and 16 located in advance of the weld point, of an oscillatory current of a frequency sufficiently high to enable welding to take place through the resistance heating effect whereby the path of the lowest possible impedance connecting electrodes 15 and 16 will be along the approaching surfaces 12a and 14a of the flanges 12 and 14, respectively, to and from the weld point w. Such frequency is preferably of the order of 100 kilocycles per second, or higher. However, it will be appreciated by those persons skilled in the art that other heating methods may be used such, for example, as induction or low frequency resistance heating.

As the opposed flanges reach welding temperature and also reach the weld point w, they are squeezed together by a pair of opposed squeeze rollers 17 and 19 that act against the exterior surfaces of the flanges 12 and 14, respectively, and that also contribute to the advancing of the assembly. Thus, the welded flange is substantially radial relatively to the cable 10 and sheath 11.

As the sheathed cable moves away from the rollers 17 and 19, a scarfing tool 20 may be utilized to remove the upper portion of the weldment, as viewed, thus producing a finished product as shown in cross-section in FIG. 3.

It is important to note that the primary objectives of the present invention are fulfilled in that the welding heat is utilized along a path that is relatively remote from the interior of the tube and hence cannot damage the cable 10 or any other material which, of necessity, may be positioned beneath the base of the flanges. Additionally, the welding bead 21, formed between the flanges, does not extend downwardly far enough to damage the cable or to interfere with flow patterns where the tube is to be used as a fluid conduit for example. The location of the bead, of course, is due to the radiused curvature of the inner surface of the tubing where it merges with the flanges.

Instead of scarfing off the excessive portion of the weldment, the welded flanges may be mashed down against the exterior surface of the tubing, or other metal element, as the case may be, as shown in FIG. 4, the means for accomplishing this step being well known in the art.

Referring now to FIGS. 5 to 8, there is shown another embodiment of the present inventive concept. In this case, the edge portions of the metal element are curved beyond 90° to form winglike flanges 22 and 23 that diverge away from one another in a direction away from the metal element 11. With flanges formed in this manner, the electrodes 15 and 16 may be applied directly to the inner surfaces of the flanges, as shown in FIG. 5, thus obviating the necessity of the current to follow a path up the exterior surfaces of the flanges and then across the edge surfaces thereof to reach the inner, opposed surfaces.

Somewhat greater stability of the assembly is also achieved by the use of this method, since as shown in FIGS. 5 and 6 squeeze rolls 24 and 25 can be shaped with opposed beveled surfaces 26 and 27 which hook in under the exterior surfaces of the flanges 22 and 23, respectively, to contribute excellent support and guidance at the region of the weld point.

As in the previous embodiment, the scarfing tool 20, if one is used, is preferably disposed slightly beyond the weld point so as to act on the weldment while it is still hot. As shown in FIG. 7, the winglike parts of the flanges are scarfed off to leave only a slight flat protrusion.

FIG. 8 illustrates in cross-section how the winglike flanges may be mashed down against the surface of the metal element 11, in lieu of scarfing.

Again it will be seen that according to the present invention there is provided a method wherein the welding heat is maintained remote from the metal elements 11 and wherein the bead 21 is in no way protrudes from the metal elements in a direction opposed to that of the flanges or, in the case of tubing, into the interior of the tubing.

If desired, where high frequency oscillatory current is used to accomplish the welding, blocks of magnetic material may be placed adjacent the flanges and in advance of the weld point. This will have the effect of increasing the inductance of the current paths along lines spaced from the exterior surfaces of the flanges, thereby forcing the high frequency current paths closer to the opposed, inner surfaces thereof. These blocks of magnetic material are preferably formed of sintered magnetic oxide insulation material in accordance with the teachings of copending application of Wallace C. Rudd, Serial No. 680,941, filed August 29, 1957 and entitled High Frequency Electrical Welding.

From the foregoing description, it will be seen that the present invention contributes a novel method of welding which is particularly desirable where it is necessary to prevent excessive welding heat from reaching one side of the metal elements being welded and to prevent the formation of protruding beads along one side of the welding seam, and particularly on the inside of tubing.

Although certain particular embodiments of the invention are herein disclosed for purposes of explanation, various further modifications thereof, after study of this

What is claimed and desired to be secured by Letters Patent is:

1. The method of welding together two opposed edge portions of metal elements of indefinite continuous length, comprising: forming opposed longitudinal flanges at said edge portions, said flanges being disposed relatively to that zone of the metal from which they are formed by an acute angle, continuously advancing said portions longitudinally from a spaced apart relation with an elongated V-shaped gap therebetween into abutting relation at the weld point while guiding said portions by providing guide elements having surfaces corresponding substantially to the opposed surfaces formed by said acute angles, respectively, whereby said guide elements engage the remote surfaces of said flanges substantially at the weld point, heating the metal along the opposed surfaces of said flanges by the application of current to said flanges at a point in advance of their point of contact, said current being at such a high frequency that the lowest impedance path thereof extends along on opposed surfaces of said flanges to and from said point of contact and whereby the resistance heating effect of such current is concentrated on those portions of said approaching surfaces that are in greatest relative proximity so that said opposed surfaces reach welding temperature at the weld point, and said guide elements acting also to squeeze said surfaces together at substantially the weld point.

2. The method of applying sheathing to cable and the like, comprising: forming opposed longitudinal flanges on the edge portions of an elongate metal strip, bringing said strip into substantially surrounding relation to a length of cable to be sheathed to form a tube therearound and whereby said flanges extend lengthwise of said cable and are spaced apart by a V-shaped gap continuously advancing said cable and strip longitudinally while heating the opposed surfaces of the flanges by the application of current to said flanges at a point in advance of their point of contact, said current being at such a high frequency that the lowest impedance path thereof extends along on opposed surfaces of said flanges to and from said point of contact and whereby the resistance heating effect of such current is concentrated on those portions of said approaching surfaces that are in greatest relative proximity so that said surfaces reach welding temperature at the apex of said gap, and squeezing said opposed surfaces together at substantially the apex of said gap.

3. The method of applying sheathing to cable and the like, comprising: forming opposed longitudinal flanges on the edge portions of an elongate metal strip, said flanges being disposed relatively to the zone of the metal from which they are formed at an acute angle, bringing said strip into substantially surrounding relation to a length of cable to be sheathed to form a tube therearound and whereby said flanges extend lengthwise of said cable and are spaced apart by a V-shaped gap, continuously advancing said portions longitudinally into abutting relation at a weld point while guiding said portions by providing guide elements having surfaces corresponding substantially to the opposed surfaces formed by said acute angles, respectively, whereby said guide elements engage the remote surfaces of said flanges substantially at the weld point, heating the opposed surfaces of the flanges by the application of current to the proximate surfaces of said flanges at a point in advance of weld point, said current being at such a high frequency that the lower impedance path thereof extends along on opposed surfaces of said flanges to and from said weld point and whereby the resistance heating effect of such current is concentrated on those portions of said approaching surfaces that are in greatest relative proximity so that said surfaces reach welding temperature at the weld point, and squeezing said opposed surfaces together at the weld point by means of said guide elements.

References Cited in the file of this patent

UNITED STATES PATENTS

| | | |
|---|---|---|
| 1,220,774 | Murray | Mar. 27, 1917 |
| 1,502,052 | Naylor | July 22, 1924 |
| 2,233,233 | Williams | Feb. 25, 1947 |
| 2,629,806 | Anderson | Feb. 24, 1953 |
| 2,697,772 | Kinghern | Dec. 21, 1954 |
| 2,794,108 | Park | May 28, 1958 |